United States Patent Office 3,826,780
Patented July 30, 1974

3,826,780
COLOR IMPROVEMENT IN STABILIZED
POLYOLEFIN RESINS
Kornel D. Kiss, Yonkers, N.Y., and Jan E. Vandegaer,
Wayne, N.J., assignors to Dart Industries Inc., Los
Angeles, Calif.
No Drawing. Filed Apr. 9, 1973, Ser. No. 349,595
Int. Cl. C08f 45/58
U.S. Cl. 260—45.85 B                                12 Claims

ABSTRACT OF THE DISCLOSURE

Polyolefin compositions containing trace quantities of multivalent metal residues, which compositions are relatively free of color when stabilized with phenolic or benzophenone type stabilizers are obtained by oxidizing said metal residues in the polyolefin to their highest valency state at temperatures where no significant degradation of the polymer occurs.

Preparations of polyolefin resins wherein monomers are polymerized in the presence of metal containing catalysts are well known in the art, especially the polymerization processes employing trivalent titanium catalysts systems (e.g. $n \cdot TiCl_3 \cdot AlCl_3$) have acquired widespread commercial recognition in the industry. The crude polymer products from these processes are subjected to deashing treatments to reduce the concentration of metals to a level where they do not significantly affect the desired quality of the final product. Such deashing processes, which also usually serve to remove low molecular weight amorphous polymers from the products, involve treatment of the crude polymer product with alcohols or mixtures of hydrocarbons and alcohols, such as heptane and an aliphatic alcohol of 1 to 4 carbon atoms, at suitable temperatures. Often a small amount of hydrochloric acid is included in the deashing medium, typically in the range from about 0.1 to about 0.5 percent by weight, to improve the efficiency of the catalyst removal. The polymer product is subsequently separated, washed, and dried in one or more steps. Generally, the total ash content is reduced by these methods, to levels in the range of about 5 to about 200 p.p.m. with corresponding titanium contents (calculated as the metal) of 1 to about 20 p.p.m., iron contents of about 1 to about 20 p.p.m. and aluminum contents of about 1 to about 50 p.p.m. These values vary depending upon the particular polymerization process used, e.g. the higher levels are usually obtained when the polypropylene is produced in a hydrocarbon diluent process, where the diluent is also used as a component of the deashing medium, while in polymerization processes employing no recirculation of hydrocarbons from the deashing step to the polymerization step significantly lower residual ash levels are generally obtained.

For reasons heretofore unknown, when adding to the deashed polymer certain stabilizers, e.g. phenolic antioxidants or benzophenone type ultraviolet stabilizers, undesirable color bodies develop which render the polymer unsuitable for many commercial uses.

Since this phenomenon occurred with polymers containing only a very few parts per million of metal residues, it was first believed that the problems was due to some deterioration of the stabilizers. However, tests disproved this theory, nor could the problem be traced to the use of improper operating conditions or lack of certain additives. It was then surprisingly found in the laboratory that when benzophenone type stabilizers were reacted in solution with titanium compounds at lower than their maximum valency state, color bodies ranging from yellow to reddish brown were developed. Similar results were obtained in reactions with such titanium compounds and phenolic stabilizers, e.g. tris(2-methyl-4-hydroxy-5-t-butyl phenyl) butane. The colors developed by these types of reactions are so strong that they are able to seriously discolor polymers which only contain trace quantities of metal compounds.

The above disadvantages are overcome by the process of the invention, which broadly involves treating a polyolefin composition derived by polymerizing at least one olefin in the presence of a catalyst comprising a halide of a metal from Group IVa, Va, or VIa, of the Periodic Table of Mendeleef, with an oxidizing agent to oxidize the metal residues present in the polyolefin to a higher valency state, under conditions that no significant degradation of the polymer occurs. It was found that incorporation of phenolic of benzophenone type stabilizers into polyolefins thus treated resulted in stabilized compositions having substantially less color bodies, as opposed to similar compositions made with untreated polyolefins. It was also found that by treatment of the latter compositions (stabilized untreated polyolefins) in accordance with the invention the obnoxious color which had developed already could be reduced to an acceptable level.

The polymerization process used to produce the polyolefin does not form a specific part of this invention. It is to be understood that the polyolefin used in the process of this invention may be formed by any known polymerization process catalyzed by the metal halides mentioned above, for example the halides of titanium, vanadium, zirconium, thorium, etc. The preferred Group IVa metal halides are the halides of titanium. One such catalyst which is used with advantage in polymerizing propylene with or without other olefinic monomers is titanium trichloride, especially titanium trichloride cocrystallized with aluminum trichloride according to the formula $n \cdot TiCl_3 \cdot AlCl_3$ where $n$ is a number from 1 to 5. As activators for the catalysts aluminum compounds containing at least one carbon to metal bond can be used. Examples of such compounds are trialkyl aluminum wherein the alkyl groups contain from 1 to 10 carbon atoms, preferably aluminum triethyl, or dialkyl aluminum monohalides wherein the alkyl group contain from 1 to 10 carbon atoms, preferably diethyl aluminum halide.

The particular composition of the polyolefin also does not form a specific part of this invention and it should be understood that the polyolefins can be homo or copolymers of various monomers. Examples of such polyolefins are polyethylene, polypropylene, copolymers of ethylene and propylene, copolymers of ethylene or propylene with higher α-olefins such as butene-1 or 4-methyl 1-pentene, etc.

Also, the method of deashing forms no specific part of this invention and it should be understood that any deashing process known in the art may be used. One such process which is used with advantage is the one of U.S. Pat. No. 3,415,799, hereby incorporated into this application by reference. Although the patented process is only disclosed in connection with polypropylene purification, it is equally well suited for purification of any of the polyolefins mentioned above.

The oxidizing agent can be any of various known oxidants such as peroxy compounds, air or oxygen, the preferred oxidants being hydrogen peroxide, air or oxygen.

The most preferred oxidizing agent, however, is hydrogen peroxide. This is so because water is the only reaction by-product from the oxidation reaction, which water is readily eliminated from the treatment zone, while some of the other oxidants mentioned above react and give by-products which interfere with the final polyolefin product quality and must be removed therefrom in separate treatment zones. Another reason for the preferred use of hydrogen peroxide is that it is available in liquid form (e.g. as a 3% solution in water) and is therefore much easier to add in exact quantities than gaseous oxidants such as air or oxygen. Furthermore, any excess hydrogen peroxide is easily eliminated after the treatment. It is preferred for safety reasons that relatively dilute solutions of hydrogen peroxide be used such as 3–20 wt. percent solution in water.

The treatment of the polyolefin in accordance with the present invention can be carried out at any point subsequent to the preparation of the polymer, i.e. the oxidant can be introduced with the deashing solvent to the deashing zone or to the drying zone or zones employed to free the polymer of residual solvent. It can also be added at even a later stage, i.e. the dry polymer can be treated with the oxidizing agent in a separate treatment zone. Furthermore, the treatment may be carried out either before or after stabilizers and other optional additives have been incorporated into the polyolefin composition. It is preferred, however, to carry out the process of the invention in conjunction with the drying of the polyolefin prior to addition of stabilizers and other optional additives. Commercially, the drying is generally accomplished in two steps, employing agitated drying zones provided with means for passing an inert sweep gas, e.g. nitrogen therethrough. A major portion of the solvent is removed in the first zone such that the partially dry polymer only contains about 1–2 percent by weight of residual solvent. The solvent evaporated from the first step is recovered, purified and recycled to the deashing zone, while the residual amount of solvent evaporated from the second drying zone can be either burned or otherwise disposed of without recovery. To minimize recovery problems and to avoid contamination by oxidants or by-products such as water in the overall process, it is therefore preferred to carry out the process of this invention in conjunction with the second drying step. The oxidant is preferably added prior to the addition of the stabilizers. It has been found that no additional time is needed over and above that required to drive off the residual solvent from the polymer.

The amount of oxidant used in the process depends upon the location of the treatment in the overall purification process. Obviously, since considerably less metals are present in the polymer subsequent to deashing considerably less oxidant need be used to accomplish the desired result. Theoretically speaking, the oxidant should be added at least in stoichiometric amounts required to increase the valency of a metal contaminant to the highest level, i.e. one half mole of released oxygen per valency level per atom of oxidizable metal contaminant calculated as the metal. This is based on the assumption, which might not necessarily be correct, that the deashed polymer contains oxidizable metal compound at a valency below the highest state. However, since the reaction is a heterogeneous reaction and the conditions are not quite favorable an excess of oxidant should be used, generally at least three times that required by stoichiometry. Thus, in the case of hydrogen peroxide as the most preferred oxidizing agent, it should be added in quantities corresponding on a weight basis to at least 1 part of hydrogen peroxide per part of oxidizable metal compound present in the polymer, the preferred ratio being from 1 to 10. The term "oxidizable metal compounds" is defined for the purpose of this invention as only those compounds present in the polymer which can exist in more than one valency state and in fact are present at valency levels lower than their highest. Titanium is one such metal, but other metals such as iron, vanadium, thorium, zirconium, etc., are included in this definition. The source of the iron can be traced to either the original catalyst composition itself where it is present as an impurity and/or to contamination due to corrosive action on equipment walls by e.g. hydrogen halide acids, formed for instance from the halogen present in the original catalyst. Aluminium contaminants on the other hand are not included in this definition since aluminum only can exist in one valency state and does not form detrimental color bodies with the particular stabilizers mentioned before.

Since relatively small quantities of oxidant are used based on the amount of polymer treated, it is preferred that the oxidant is dissolved in a suitable "wetting" solvent to assure even distribution over the surfaces of the polymer particles and to improve the contact between the polymer and the oxidizing agent. This is an important feature when relatively dry polymer is to be treated, due to the fact that the catalyst residue traces are embedded in the polymer particles. Thus, in the case of hydrogen peroxide, which is available as water solutions, the preferred solvents are those which are miscible with water and easy to evaporate, such as water soluble alcohols in the $C_1$–$C_5$ range. Conveniently, the same alcohol is used for this purpose as the one present in the deashing solvent, e.g. isopropyl alcohol. Typically the "wetting solvent" is used in quantities corresponding to 0.075 to 0.25 gallons per 1000 pounds of polymer.

The process of the invention can be carried out at any pressure, usually at atmospheric pressure. Since the oxidation proceeds readily at low temperatures, e.g. room temperature and below, there is no critical lower temperature limit. Care should be taken, however, that the process temperature is below the "tacky" point of the particular polymer undergoing treatment. The tacky point of the polymer is defined as that temperature at which the surfaces of the polymer particles become sufficiently soft so as to be tacky and tend to stick to one another and to other surfaces. In the preferred embodiment of this invention, wherein the oxidation is carried out in the second stage dryer, the temperature is the same as that required for the drying, which usually is above 150° F. For polypropylene, a suitable range is between 180° F. and 250° F.

When treated in accordance with the invention, the polymers can be stabilized with phenolic and benzophenone type stabilizers without deleterious formation of color bodies. Such phenolic stabilizers include:

t-butyl hydroxyl toluenes;
3,5-di-t-butyl-4-hydroxybenzylphosphonate;
tetrakis[methylene(3,5-di-t-butyl-4-hydroxyhydrocinnamate)] methane;
3,5-di-t-butyl-4-hydroxycinnamic acid octadecyl ester;
1,3,5-trimethyl-2,4,6-tris[3,5-di-t-butyl-4-hydroxybenzyl] benzene;
2,6-dioctadecyl p-cresol;
tris(2-methyl-4-hydroxy-5-t-butyl-phenyl) butane;
4,4-thio bis (6-t-butyl-m-cresol);
2,2'-methylene bis(4-methyl-6-t-butyl phenol);
1,3,5-tris(3,5-di-t-butyl-4-hydroxybenzyl)-5-triazine-2,4,6-(1H,3H,5H)-trione;
tri(mixed mono and dinonyl phenyl) phosphite, etc.

Examples of common benzophenone type stabilizers are 2-hydroxy-4-alkoxy benzophenones, such as 2-hydroxy-4-eptoxy-benzophenone, 2-hydroxy-4-octoxy benzophenone, 2-hydroxy-4-dodecyloxy-benzophenone. Other stabilizing additives, e.g. esters of thio di-alkanoic acids, acid scavengers, and additives with no stabilizing effect such as pigments and colorants, antistatic agents, processing aids and lubricants etc. may also be present.

The following examples illustrate the process of the invention. In all cases the polypropylene was prepared by polymerization in the presence of a catalyst, which was titanium trichloride cocrystallized with aluminum trichloride and activated with diethyl aluminum monochloride. All parts and percentages are by weight unless otherwise indicated. The color (yellowness) of the polymers were determined by (1) ASTM D–1925 and (2) Gardner Scale Determination (Gardner Laboratories, Inc., Bethesda, Md.). The latter is carried out by visual colormatching of a molded polymer sample (⅛″ thick) with one of a series of standard solutions having colors ranging from mater white (rating 1) to deep brown (rating 18).

CONTROL EXAMPLE 1

6000 lbs. of polypropylene powder estimated to contain 5 p.p.m. Ti, 1 p.p.m. Fe and 6 p.p.m. Al were blended with 24 lbs. of 2-hydroxy-4-n-octoxy benzophenone and 6 lbs. of tris (2-methyl-4-hydroxy-5-tert-butylphenyl) butane in the absence of air in a ribbon blender. Part of the blender powder (0.1 lbs.) was removed and kneaded in a laboratory scale Banbury type mixer for 4 minutes at 190° C. stock temperature. After kneading, the product was removed from the mixer, cooled to room temperature and ground to a coarse powder. This was compression molded in an electrically heated hydraulic press to a disc, about ⅛″ thick and about 2″ in diameter. The color of the disc was compared to the Gardner color scale in transmitted light and judged 11 (very deep yellow) on this scale.

EXAMPLE 2

A sample of partially dry polypropylene powder (containing about 1 wt. percent IPA/heptane azeotrope) estimated to contain the same amount of catalyst residues as that of Control Example 1 was taken from a second stage dryer (ribbon blender) immediately after the resin was transferred from the first stage dryer. The polypropylene powder container no stabilizers at this stage. The sample was taken without precaution to exclude air and the sample was dried in the presence of air at about 220° F. for approximately 5 hours. The same proportions of stabilizers were added as in Example 1 in the Banbury under the same conditions. The color of a molded specimen registered 3 (off-white) on the Gardner scale, demonstrating the beneficial effect of treatment with an oxygen containing gas.

CONTROL EXAMPLE 3

Example 1 was repeated with another 0.1 lb. portion of the stabilized polypropylene blend, except that it was treated with about 100 cc. of commercial grade anhydrous isopropyl alcohol for 10 minutes and dried prior to the kneading in the Banbury. A molded disc specimen registered between 10 and 11 on the Gardner scale, i.e., no improvement was obtained by the treatment.

EXAMPLE 4

Control Example 3 was repeated except that 2 cc. aqueous hydrogen peroxide (3 wt. percent peroxide in water) was premixed with the isopropyl alcohol. The color of a molded disc specimen was comparable to number 4 on the Gardner scale (pale yellow).

CONTROL EXAMPLE 5

Nine different lots consisting of 10 to 20 batches of 6000 lbs. of partially dry polypropylene powder (IPA/heptane azeotrope content about 1 wt. percent) each containing the stabilizers of Example 1 were heated in an agitated second stage dryer (ribbon blender) at about 200° F. for about one hour. The dried products were sampled and parts of the samples were molded into ⅛″ by 2″ discs. The color of each disc was measured according to ASTM D-1925. The metal contents and the color indices of the respective lots are reported in Table I below. The color indices ranged from 47.3 to 91.6 with an average value of 71.2 which appears as a very deep yellow color to the eye.

TABLE I

| | P.p.m. | | | Color index |
|---|---|---|---|---|
| | Al | Ti | Fe | |
| Lot: | | | | |
| 1 | 1 | 3 | 2 | 47.3 |
| 2 | 1 | 3 | 1 | 58.5 |
| 3 | 5 | 2 | 1 | 62.5 |
| 4 | 9 | 3 | 1 | 74.8 |
| 5 | 25 | 7 | 1 | 67.7 |
| 6 | 8 | 2 | 1 | 56.9 |
| 7 | 5 | 4 | 1 | 91.6 |
| 8 | 6 | 5 | 1 | 91.2 |
| 9 | 8 | 6 | 1 | 90.7 |

EXAMPLE 6

Control Example 5 was repeated using 28 different lots of 10 to 20 batches, except that small quantities of a mixture of 2 parts by volume isopropyl alcohol and 1 part aqueous hydrogen peroxide (3% by weight) were added to the agitated second stage drier at the beginning of the drying cycle and prior to the stabilizer addition. After 20 to 30 minutes, the stabilizers were added and the blending continued. Representative samples taken from each lot were tested for color per ASTM D-1925. The metals contents, hydrogen peroxide addition (computed as parts per million parts of polypropylene) and resulting color indices are shown in Table II. The color indices ranged from 25.4 to 51.2 with an average value of 32.8 (appears as a pale yellow and is comparable to the 4 or 5 level on the Gardner scale). Both the average value and the limits of the range are approximately one half of the corresponding values of Control Example 5.

TABLE II

| | P.p.m. | | | | Color index |
|---|---|---|---|---|---|
| | Al | Ti | Fe | $H_2O_2$ | |
| Lot: | | | | | |
| 10 | 3 | 1 | 1 | 11 | 38.3 |
| 11 | 5 | 3 | 3 | 11 | 35.3 |
| 12 | 7 | 4 | 2 | 14 | 30.1 |
| 13 | 9 | 5 | 1 | 14 | 25.6 |
| 14 | 5 | 4 | 1 | 14 | 28.7 |
| 15 | 6 | 3 | 1 | 14 | 27.5 |
| 16 | 6 | 5 | 1 | 14 | 29.5 |
| 17 | 7 | 4 | 1 | 14 | 25.4 |
| 18 | 6 | 4 | 1 | 14 | 30.1 |
| 19 | 6 | 3 | 2 | 17 | 34.2 |
| 20 | 6 | 3 | 1 | 14 | 30.9 |
| 21 | 7 | 4 | 1 | 14 | 29.2 |
| 22 | 7 | 8 | 1 | 14 | 30.9 |
| 23 | 6 | 7 | 1 | 14 | 34.8 |
| 24 | 6 | 6 | 1 | 14 | 41.8 |
| 25 | 6 | 7 | 1 | 14 | 35.4 |
| 26 | 5 | 8 | 2 | 14 | 51.2 |
| 27 | 6 | 7 | 1 | 14 | 34.7 |
| 28 | 6 | 4 | 1 | 14 | 34.7 |
| 29 | 7 | 5 | 1 | 14 | 32.7 |
| 30 | 6 | 5 | 1 | 14 | 32.5 |
| 31 | 4 | 3 | 1 | 14 | 27.2 |
| 32 | 5 | 2 | 1 | 6 | 36.1 |
| 33 | 5 | 3 | 1 | 6 | 29.2 |
| 34 | 4 | 3 | 1 | 6 | 31.5 |
| 35 | 7 | 8 | 1 | 14 | 31.6 |
| 36 | 5 | 7 | 1 | 14 | 43.8 |
| 37 | 1 | 3 | 1 | 14 | 25.9 |

What is claimed is:

1. In a process for the preparation of a deashed polyolefin stabilized with phenolic or benzophenone type stabilizers or mixtures thereof, which deashed polyolefin contains residual quantities of oxidizable compounds of metals selected from iron and metals of Groups IVa, Va and VIa of the Periodic Table of Mendeleef and mixtures thereof, the improvement which comprises:
   contacting the deashed polyolefin before or after addition of said stabilizers with an oxidizing agent selected from peroxy compounds, air or oxygen under conditions that no significant degradation of the polyolefin occurs, the amount of oxidizing agent being at least three times that required by stoichiometry to oxidize the metallic compounds to a higher valency state, and
   recovering the stabilized polyolefin containing said residual quantities of metallic compounds oxidized to said higher valency state.

2. A process according to claim 1 wherein the oxidizing agent is hydrogen peroxide.

3. A process according to claim 1 wherein the oxidizable compounds of metals are titanium compounds and iron compounds.

4. A process according to claim 2 wherein the polyolefin is a deashed polyolefin and the hydrogen peroxide is added as an aqueous solution thereof mixed with a water miscible solvent.

5. In a process for the preparation of a deashed polyolefin stabilized with phenolic or benzophenone type stabilizers or mixtures thereof, including the process steps of polymerization in the presence of a trivalent titanium halide catalyst, deashing the polymer thus prepared with a deashing medium comprising an alcohol to produce a deashed polyolefin containing residual quantities of oxidizable metallic residues selected from titanium compounds, iron compounds or mixtures thereof, and partially drying the deashed polyolefin in a first agitated drying zone, the improvement which comprises:

introducing the partially dride deashed polyolefin to a second agitated drying zone;

adding hydrogen peroxide oxidizing agent to said second drying zone in an amount corresponding to at least 1 part of hydrogen peroxide per part of titanium and iron compounds, calculated as the metal, present in the deashed polyolefin;

maintaining the mixture under conditions that no significant degradation of the polyolefin occurs;

adding stabilizers selected from phenolic or benzophenone type stabilizers to said drying zone; and recovering a dry, stabilized polyolefin containing said residual quantities of metallic residues oxidized to a higher valency state.

6. A process according to claim 5, wherein the polyolefin is a polyolefin composition taken from the group consisting of polyethylene, polypropylene, copolymers of ethylene and propylene, copolymers of ethylene or propylene with butene-1 or 4-methyl 1-pentene.

7. A process according to claim 5, wherein the hydrogen peroxide is added as an aqueous solution mixed with a water miscible solvent.

8. A process according to claim 7, wherein the water miscible solvent is an alcohol.

9. A process according to claim 8, wherein the alcohol is the same as the one of the deashing medium.

10. A process according to claim 9, wherein the alcohol is isopropyl alcohol.

11. A stabilized polyolefin prepared by the process of claim 1.

12. A stabilized polyolefin prepared by the process of claim 5.

References Cited

UNITED STATES PATENTS

| | | | |
|---|---|---|---|
| 3,177,193 | 4/1965 | Scott, Jr. | 260—94.9 GC |
| 3,496,156 | 2/1970 | Luciani et al. | 260—94.9 F |
| 3,112,299 | 11/1963 | Borrows et al. | 260—94.9 F |
| 3,216,986 | 11/1965 | Fritz et al. | 260—94.9 F |

MELVYN I. MARQUIS, Primary Examiner

U.S. Cl. X.R.

260—45.85 T, 45.95 R, 45.95 C, 45.95 D, 45.95 H, 94.9 GC, 94.9 F